(12) United States Patent
Salamat

(10) Patent No.: US 8,720,194 B2
(45) Date of Patent: May 13, 2014

(54) EXHAUST EVACUATION APPARATUS

(76) Inventor: Jafar Salamat, Edmond, OK (US)

(*) Notice: Subject to any disclaimer, the term of this patent is extended or adjusted under 35 U.S.C. 154(b) by 260 days.

(21) Appl. No.: 13/364,867

(22) Filed: Feb. 2, 2012

(65) Prior Publication Data

US 2013/0199166 A1    Aug. 8, 2013

(51) Int. Cl.
F02B 35/00        (2006.01)

(52) U.S. Cl.
USPC ................................ 60/315; 60/280

(58) Field of Classification Search
USPC .................................... 60/280, 315
See application file for complete search history.

(56) References Cited

U.S. PATENT DOCUMENTS

| | | | |
|---|---|---|---|
| 3,107,484 A | 10/1963 | Touhey | |
| 3,350,877 A * | 11/1967 | Bowman | 60/310 |
| 3,417,549 A * | 12/1968 | Leosis | 96/136 |
| 4,313,523 A | 2/1982 | Copen | |
| 4,665,691 A | 5/1987 | Eller | |
| 5,282,361 A | 2/1994 | Sung | |
| 5,896,744 A | 4/1999 | Lee | |
| 5,941,069 A * | 8/1999 | Heath | 60/307 |
| 5,962,822 A | 10/1999 | May | |
| 6,343,673 B1 | 2/2002 | Chang | |
| 6,679,351 B2 | 1/2004 | Cummings et al. | |
| 6,796,296 B2 | 9/2004 | Kim | |
| 6,840,212 B2 | 1/2005 | Kim | |
| 7,987,665 B2 | 8/2011 | Salamat | |
| 2010/0058749 A1 | 3/2010 | Salamat | |

* cited by examiner

*Primary Examiner* — Thomas Denion
*Assistant Examiner* — Jason Shanske
(74) *Attorney, Agent, or Firm* — Dunlap Codding, P.C.

(57) ABSTRACT

An apparatus for evacuating exhaust from an exhaust pipe of a vehicle having an external turbine and an internal turbine connected to the external turbine such that when the external turbine rotates the internal turbine rotates. An apparatus for evacuating exhaust from an exhaust pipe of a vehicle having an external turbine, an external motor assembly and an internal turbine connected to the external motor assembly such that the external motor assembly rotates the internal turbine, and the external turbine drives the external motor assembly when the external turbine reaches a greater rate of rotation than the external motor assembly.

7 Claims, 4 Drawing Sheets

EXHAUST EVACUATION APPARATUS

BACKGROUND

Internal combustion engines produce exhaust gases as a byproduct of the combustion process. In general, exhaust gases are expelled through an exhaust manifold which is designed to collect exhaust gases from one or more cylinders. The exhaust manifold is connected to an exhaust pipe which communicates exhaust gases into the open air. Internal combustion engines suffer from common drawbacks associated with the use of exhaust systems. In particular, exhaust gases which move through bends and past obstructions within exhaust pipes, mufflers, and/or catalytic converters serve to reduce the performance (i.e., lower peak engine power, lower gas mileage) of the engine by creating back pressures. Therefore, reducing back pressures within the exhaust system causes the engine to operate more efficiently, provides enhanced performance, and increases the gas mileage of an internal combustion engine.

Previous attempts to reduce back pressure within exhaust systems include removing or modifying the exhaust muffler. However, such attempts are replete with drawbacks. For example, removing the exhaust muffler eliminates one source of the back pressure, but also results in non-desirous engine noise. Other attempts to reduce back pressure within exhaust systems include positioning of a turbine within the exhaust pipe to draw the exhaust gases from the exhaust pipe. The internal turbine may be powered by the motion of the exhaust gases or be powered by a power source, such as an electric motor within the exhaust system. However, internal turbines powered by exhaust gases alone produce little effect. The efficiency of an internal turbine may be increased if the internal turbine is powered by an electric motor; however, electric motors operating within an exhaust pipe are subjected to high temperatures and corrosive effects from exhaust gases passing through the exhaust pipe. Electric motors operating in high temperature environments suffer from increased wear and tear and therefore require more frequent maintenance.

In other attempts to reduce the back pressure of an exhaust system, an external turbine is positioned such that the blades of the external turbine are disposed about the exhaust pipe near the discharge end of the exhaust pipe. While use of an external turbine has met with success, this design can limit the air flow that reaches the external turbine due to the obstruction of air flow by the exhaust pipe itself. Further, the amount of surface area of the blades available for receiving air flow is reduced for a turbine having a selected diameter due to the space filled by the exhaust pipe, thereby lowering efficacy of the system.

Therefore, a need exists for an exhaust evacuation apparatus that reduces the back pressure of an exhaust system, and improves the efficiency and performance of an associated internal combustion engine while avoiding the drawbacks of the previous systems. It is to such an exhaust evacuation apparatus that the present invention is directed.

DESCRIPTION OF THE SEVERAL VIEWS OF THE DRAWINGS

The accompanying drawings, which are incorporated in and constitute a part of this specification, illustrate one or more implementations described herein and, together with the description, explain these implementations. In the drawings.

DETAILED DESCRIPTION OF EXEMPLARY EMBODIMENTS

The following detailed description refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
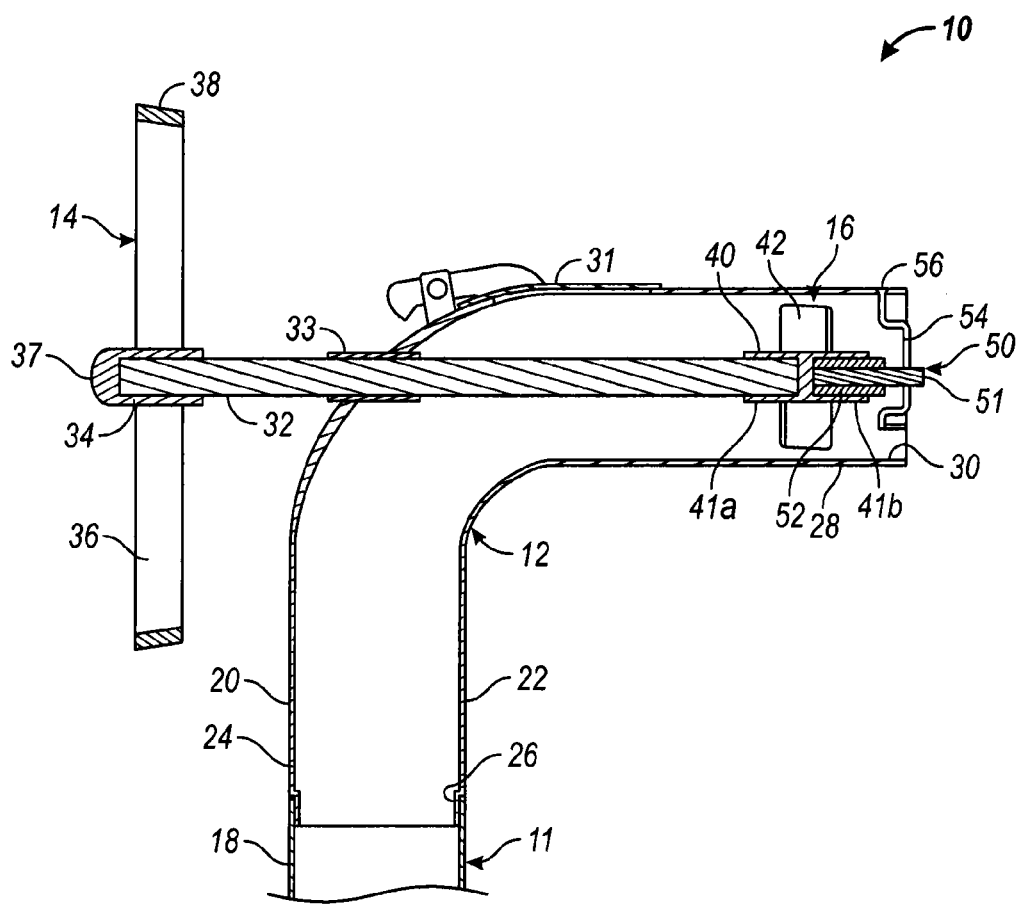
FIG. 1 is a cross sectional view of an exhaust evacuation apparatus shown in association with an exhaust pipe.
Figure 2:
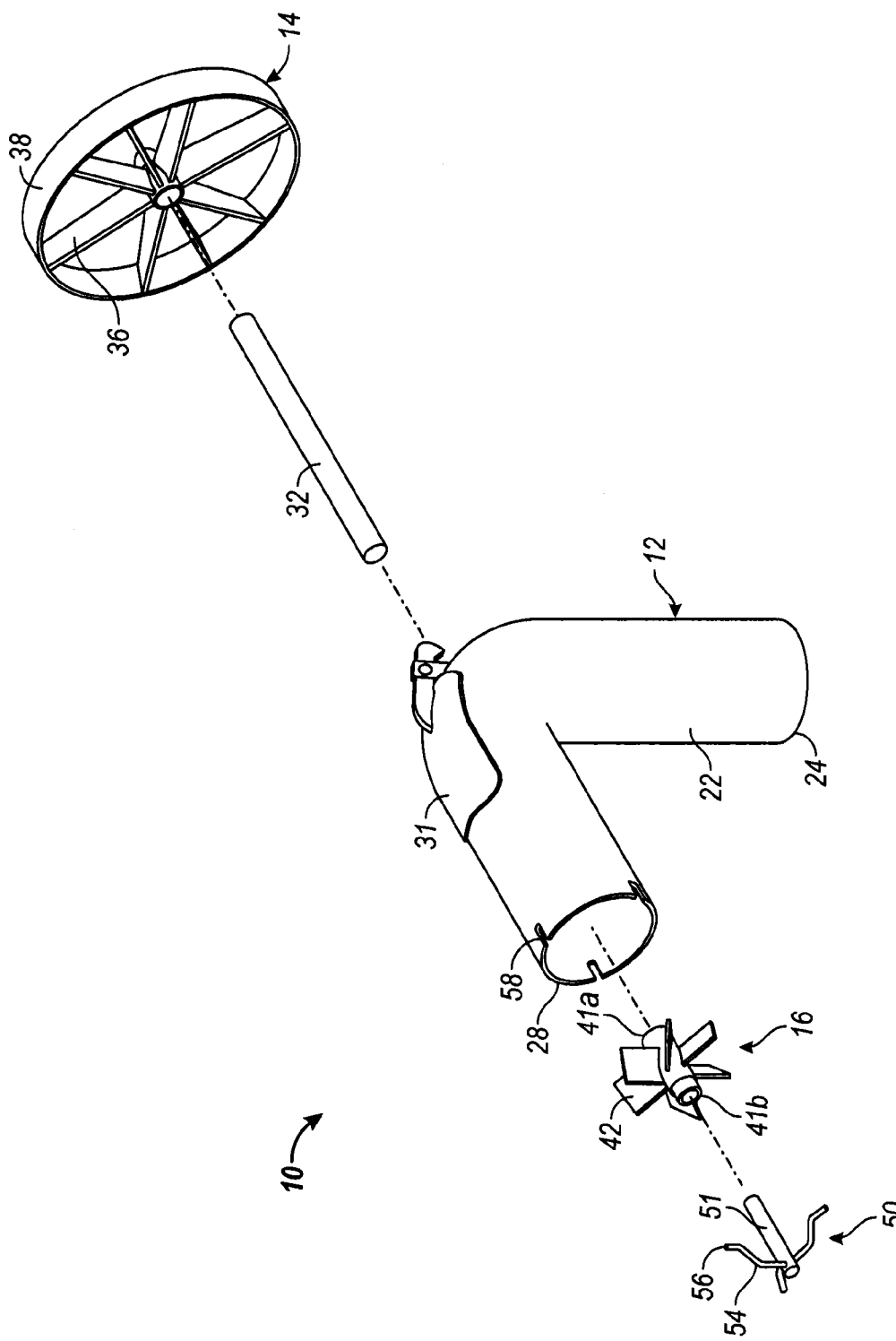
FIG. 2 is an exploded perspective view of the exhaust evacuation apparatus of FIG. 1.

Referring now to the drawings and more particularly to FIGS. 1 and 2, collectively shown therein is an exhaust evacuation apparatus 10 for evacuating exhaust from an exhaust pipe such as the exhaust pipe 11 of a vehicle (not shown). The exhaust evacuation apparatus 10 comprises an exhaust pipe extension 12, an external turbine 14, and an internal turbine 16. The exhaust pipe extension 12 is connected to a distal end 18 of the exhaust pipe 11 of the vehicle. The external turbine 14 is located exteriorly to and forwardly of the exhaust pipe extension 12, while the internal turbine 16 is positioned within the exhaust pipe extension 12. The external turbine 14 is connected to the internal turbine 16 such that when the external turbine 14 rotates due to air flowing over the external turbine 14, the internal turbine 16 rotates, thereby causing exhaust of the vehicle to be drawn or extracted from the exhaust pipe 11 of the vehicle.

The exhaust pipe extension 12 is a tubular member characterized as having a leading side 20 and a trailing side 22. The exhaust pipe extension 12 has a proximal end portion 24 defining an exhaust inlet 26, and a distal end portion 28. The distal end portion 28 is angularly disposed relative to the proximal end portion 24 and defines an exhaust outlet 30 directed away from the leading side 20.

In use, the leading side 20 of the exhaust pipe extension 12 generally corresponds with the front end of a vehicle such that when the vehicle is in forward motion, air flow encounters the leading side 20 before the air flow encounters the trailing side 22 of the exhaust pipe extension 12. The trailing end side 22 generally corresponds with the back end of the vehicle.

The proximal end portion 24 of the exhaust pipe extension 12 is intended to be connected to the distal end 18 of the exhaust pipe 11 of the vehicle in any suitable fashion, such as welding. Exhaust from the vehicle travels through the distal end 18 of the exhaust pipe 11 into the exhaust inlet 26 of the exhaust pipe extension 12. Exhaust then travels through the exhaust pipe extension 12 to the distal end portion 28 of the exhaust pipe extension 12 and exits the exhaust outlet 30 of the exhaust pipe extension 12.

In one version, as illustrated in FIG. 1, the distal end portion 28 of the exhaust pipe extension 12 is angularly disposed relative to the proximal end portion 24 at an angle of about ninety degrees. However, it should be appreciated that the angle between the distal end portion 28 and the proximal end portion 24 may be greater than or less than ninety degrees.

The external turbine 14 is supported exteriorly of the exhaust pipe extension 12 and forwardly of the leading side 20 of the exhaust pipe extension 12. In one embodiment, the external turbine 14 has a hub 34 and a plurality of blades 36 extending radially from the hub 34. The hub 34 of the external turbine 14 is fabricated from a rigid material, such as metal, plastic, a resin, or the like. The hub 34 illustrated in FIGS. 1 and 2 has substantially tubular geometry, although the hub 34 may have any number of differing geometries that would be known to one of ordinary skill in the art having the present disclosure before them. Also, to improve the aerodynamic properties of the hub 34, the hub 34 may include a conical tip 37.

The blades 36 extending from the hub 34 may be spaced at substantially equal angular increments about the hub 34. The number, angle, pitch, spacing, and geometry of the blades 36 may vary according to design requirements. The external turbine 14 may optionally include an outer ring 38. The outer ring 38 is connected to the outer ends of the blades 36 to provide a protective covering and to reduce physical damage to the blades 36.

The position of the external turbine 14 exterior to, and forward of, the leading side 20 of the exhaust pipe extension 12 allows more air flow to reach the external turbine 14, as the air flow to the blades 36 is unimpeded by the exhaust pipe extension 12, and allows the blades 36 of the external turbine 14 to have greater surface area while maintaining a minimal outer diameter.

The internal turbine 16 is supported in the distal end portion 28 of the exhaust pipe extension 12. In one embodiment, the internal turbine 16 has a hub 40 and a plurality of blades 42 extending radially from the hub 40. The hub 40 may be formed of any suitable rigid material, such as metal, plastic, a resin, or the like. The hub 40 is shown as having recesses 41*a* and 41*b* and a substantially cylindrical geometry, although the hub 40 may have any number of differing geometries that would be known to one of ordinary skill in the art having the present disclosure before them. The hub 40 is preferably constructed to have a minimal diameter so as not to impede the flow of exhaust gases through the exhaust pipe extension 12. The blades 42 may be spaced at substantially equal angular increments about the hub 40. The number, angle, pitch, spacing, and geometry of the blades 42 may vary according to design requirements.

In one embodiment, the internal turbine 16 is rotatably supported by a support member 50. The support member 50 is used to attach the internal turbine 16 with at least a portion of the exhaust pipe extension 12. In one version, as shown in FIGS. 1 and 2, the support member 50 has a hub 51 and brace members 54 extending from the hub 51. The brace members 54 connect to at least a portion of the exhaust pipe extension 12. In FIGS. 1 and 2, the distal ends of the brace members 54 are provided with flanged ends 56, and the exhaust pipe extension 12 is provided with a plurality of notches 58 for receiving the flanged ends 56 of the brace members 54. The brace members 54 are shown to have a generally cylindrical shape. To increase efficiency and aerodynamic performance, however, the brace members 54 may be formed of varying shapes, such as an air foil.

The internal turbine 16 may connect with the support member 50 through a bearing 52, as shown in FIG. 1. The bearing 52 allows rotation of the internal turbine 16 while support member 50 remains stationary within exhaust pipe extension 12. It should be understood that rotatable support may be provided by any type of rotatable connection, such as a bushing or other like connection, as is well known in the art.

The external turbine 14 is connected to the internal turbine 16 in such a way that when the external turbine 14 rotates the internal turbine 16 rotates. When the vehicle is in forward motion, air flow over the external turbine 14 causes the external turbine 14 to rotate and thereby causes the internal turbine 16 to rotate, which causes exhaust of the vehicle to be drawn or extracted from the exhaust pipe extension 12. In situations where the vehicle is not moving, the exhaust pipe extension 12 may include an idle door 31 which allows exhaust gases to vent directly up through the exhaust pipe extension 12.

In one embodiment, the internal turbine 16 and the external turbine 14 are axially aligned and connected with a shaft 32, as depicted in FIG. 1. The shaft 32 extends through the leading side 20 of the exhaust pipe extension 12, connecting the external turbine 14 to the internal turbine 16. The shaft 32 is connected to the internal turbine 16 through the recess 41*a* of the internal turbine 16 such that when the shaft 32 rotates the internal turbine 16 rotates. The shaft 32 and the internal turbine 16 may be connected in any way, such as through the use of press fit, splines, or other connections that are well known in the art. The shaft 32 is connected to the external turbine 14 in a similar manner such that when the external turbine 14 rotates, the shaft 32 rotates. It should be understood that the external turbine 14 and internal turbine 16 may be connected by gearing, pulleys, multiple shafts, or other connecting mechanisms. Also, the internal turbine 16 and the external turbine 14 may be on different axes.

In one embodiment in which shaft 32 is utilized, the leading side 20 of exhaust pipe extension 12 may be thickened at the location of the intersection of the shaft 32 and the leading side 20. As illustrated in FIG. 1, a bearing assembly 33 may be located within the leading side 20 of the exhaust pipe extension 12 at the location of the intersection of the shaft 32 and the leading side 20 to support the shaft 32. It should be understood that any type of support may be used between the shaft 32 and the leading side 20, such as a plate, a bushing, or any other support as is well known in the art.

In some applications it may be advantageous to regulate the speed at which the internal turbine 16 turns. Therefore, the exhaust evacuation apparatus 10 may further comprise a transmission assembly (not shown) linking the external turbine 14 to the internal turbine 16 such that the internal turbine 16 rotates at a rate different than the rate of rotation of the external turbine 14. The transmission assembly provides a mechanical linkage between the external turbine 14 and the internal turbine 16. More particularly, the transmission assembly provides speed-torque conversion, converting the high torque, low RPM generated by the external turbine 14 to a higher RPM for the internal turbine 16, or vice versa. The transmission assembly may comprise, for example, a plurality of gears having specific gear ratios. The gear ratios of the plurality of gears may be varied according to design requirements.

In use, the exhaust evacuation apparatus 10 is secured to the exhaust pipe 12 of a vehicle (not shown). More preferably, the exhaust evacuation apparatus 10 is secured to the exhaust pipe 11 of a vehicle having an exhaust pipe 11 positioned substantially vertically. The external turbine 14 is positioned substantially parallel and forward facing to the travel path of the vehicle. Forward motion of the vehicle causes air to flow over the blades 36 of the external turbine 14. The flow of air over the blades 36 causes the external turbine 14 to rotate. The rotation of the external turbine 14, in turn, causes the internal turbine 16 to rotate. Rotation of the internal turbine 16 causes exhaust gases to more effectively pass from inside the exhaust pipe 11 of the vehicle.

Figure 3:
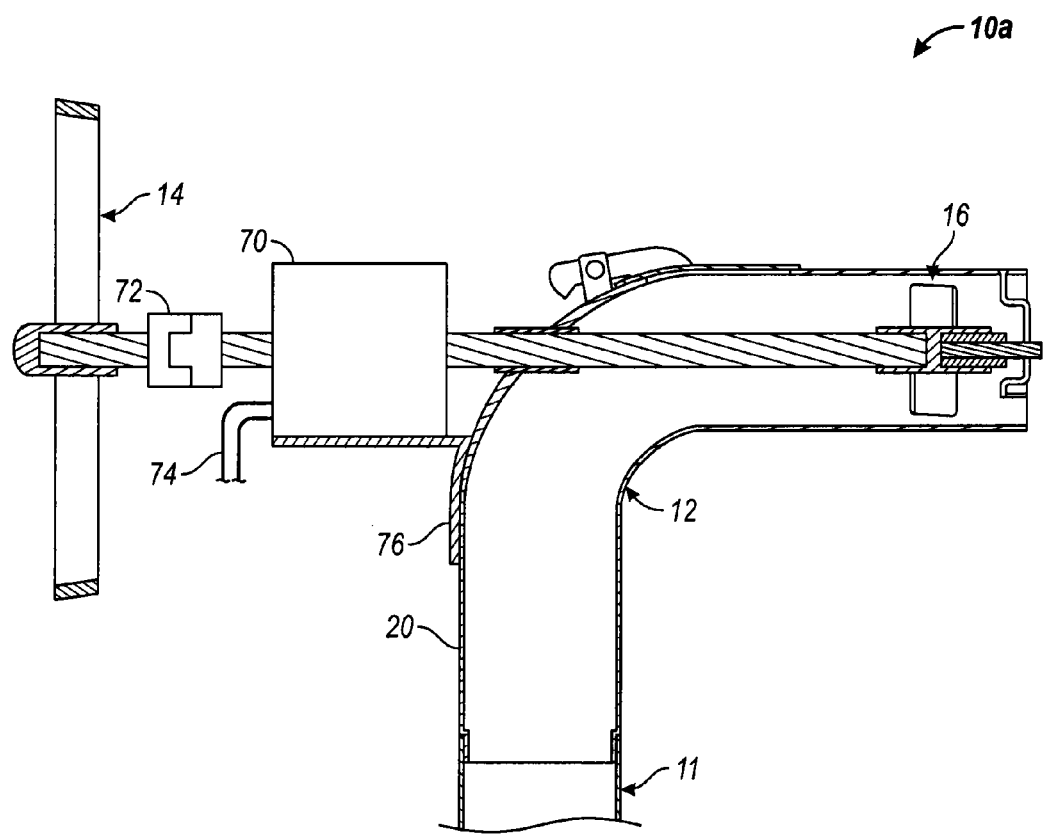
FIG. 3 is a cross-sectional view of another embodiment of an exhaust evacuation apparatus.

Another embodiment of the exhaust evacuation apparatus 10a is illustrated in FIG. 3. The exhaust evacuation apparatus 10a is similar to the exhaust evacuation apparatus 10 except the exhaust evacuation apparatus 10a includes a motor 70 and a linkage 72.

The motor 70 is supported exteriorly of the exhaust pipe extension 12 and interposed between the external turbine 14 and the internal turbine 16. The motor 70 may be any suitable motor, such as an electric motor. The motor 70 may be connected via electrical connection 74 to an external power source, such as the electrical system of a vehicle (not shown), or an independent power source. The motor 70 may be supported by an external bracket 76, such as that illustrated in FIG. 3. However, it should be understood that any type of support may be used, such as bands, bolts, plates, or stands. Additionally, the motor 70 may be supported by structures other than the exhaust pipe extension 12, such as by components of the vehicle (not shown).

A linkage 72 connects the external turbine 14 to the motor 70 in such a way that the external turbine 14 drives the motor 70 only when the external turbine 14 is caused to rotate at a rate greater than a rate of rotation of the motor 70. The linkage 72 may be any suitable mechanism, such as an overrunning clutch, a freewheel mechanism, an electrical system, or any other one-way synchronization system.

In use, the motor 70 causes the internal turbine 16 to rotate. Rotation of the internal turbine 16 causes exhaust gases to more effectively pass from inside the exhaust pipe 11 of the vehicle. When air flow causes the external turbine 14 to rotate at a rate greater than the rate of rotation of the motor 70, then the linkage 72 is engaged and the external turbine 14 drives the motor 70 in causing the internal turbine 16 to rotate. When the external turbine 14 does not rotate at a rate greater than the rate of the motor 70, then the linkage 72 is disengaged.

Figure 4:
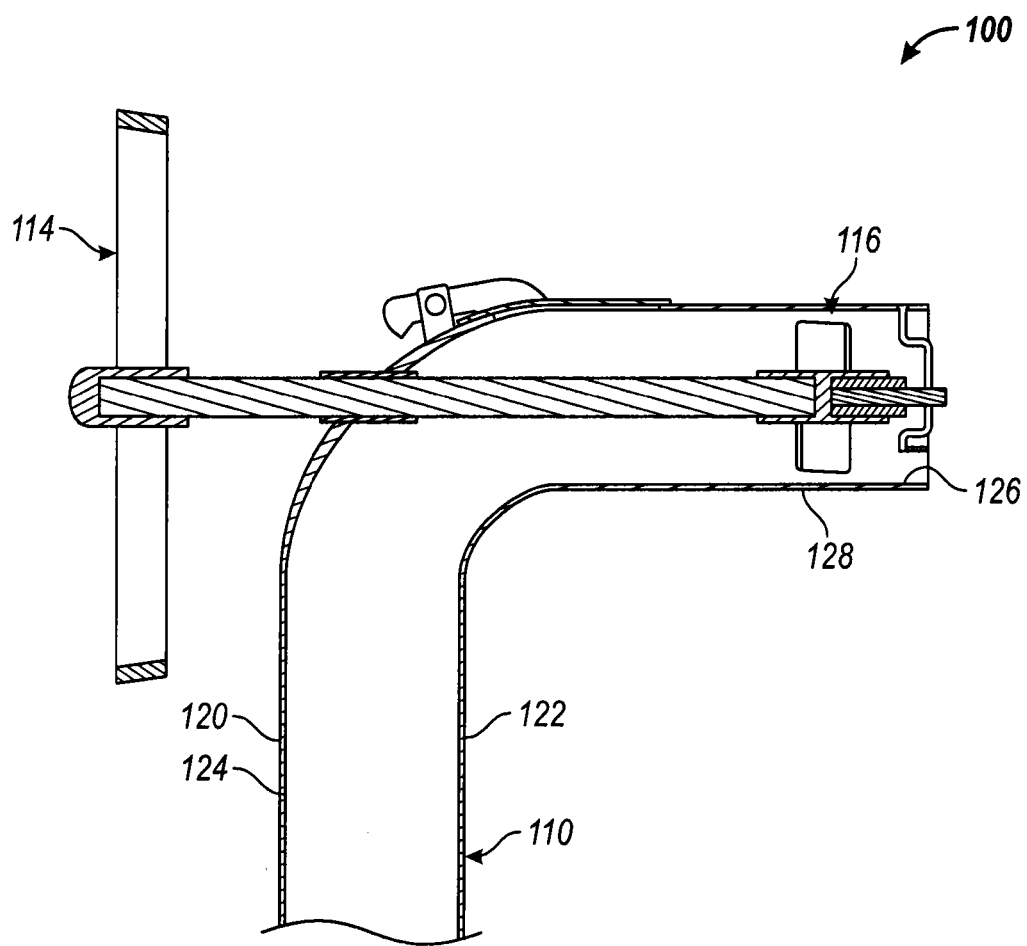
FIG. 4 is a cross sectional view of another embodiment of an exhaust evacuation apparatus shown mounted in an exhaust pipe of a vehicle.

In one embodiment, as illustrated in FIG. 4, an exhaust evacuation apparatus 100 may be in combination with an exhaust pipe 110 of a vehicle (not shown). Whereas in previously described embodiments, the exhaust evacuation apparatuses 10 and 10a were separate from the exhaust pipe 11 of a vehicle, FIG. 4 illustrates a combination of an exhaust evacuation apparatus 100 and an exhaust pipe 110 of a vehicle. The features of the exhaust evacuation apparatus 100 combination are substantially similar to those described for the exhaust evacuation apparatus 10 and 10a. The exhaust pipe 110 has a leading side 120, a trailing side 122, a vertically oriented portion 124, and a distal end portion 128 angularly disposed relative to the vertically oriented portion 124 and defining an exhaust outlet 126 directed away from the leading side 120. The exhaust evacuation apparatus 100 further comprises an internal turbine 116 supported in the distal end portion 128 of the exhaust pipe 110 and an external turbine 114 supported exteriorly of the exhaust pipe 110 and forwardly of the leading side 120. The external turbine 114 is connected to the internal turbine 116 in such a way that when the external turbine 114 rotates the internal turbine 116 rotates. The various embodiments of the exhaust evacuation apparatus 10 and 10a discussed above are applicable to the exhaust evacuation apparatus 100.

From the above description, it is clear that the present invention is well adapted to carry out the objects and to attain the advantages mentioned herein as well as those inherent in the invention. While exemplary embodiments of the inventive concepts have been described for purposes of this disclosure, it will be understood that numerous changes may be made which will readily suggest themselves to those skilled in the art and which are accomplished within the spirit of the invention disclosed and as defined in the appended claims.

What is claimed is:

1. An apparatus for evacuating exhaust from an exhaust pipe of a vehicle, comprising:
   an exhaust pipe extension having a leading side, a trailing side, a proximal end portion defining an exhaust inlet, and a distal end portion angularly disposed relative to the proximal end portion and defining an exhaust outlet directed away from the leading side, the proximal end portion being connectable to a distal end of the exhaust pipe of the vehicle;
   an internal turbine supported in the distal end portion of the exhaust pipe extension; and
   an external turbine supported exteriorly of the exhaust pipe extension and forwardly of the leading side of the exhaust pipe extension, the external turbine connected to the internal turbine in such a way that when the external turbine rotates the internal turbine rotates.

2. The apparatus of claim 1 wherein the distal end portion is angularly disposed relative to the proximal end portion at an angle of about 90 degrees.

3. The apparatus of claim 1 wherein the external turbine and the internal turbine are axially aligned.

4. The apparatus of claim 1, wherein the external turbine has a hub and a plurality of blades extending radially from the hub.

5. The apparatus of claim 1, further comprising a transmission assembly linking the external turbine to the internal turbine such that the internal turbine rotates at a rate different than the rate of rotation of the external turbine.

6. The apparatus of claim 1, further comprising:
   a motor supported exteriorly of the exhaust pipe extension and interposed between the external turbine and the internal turbine; and
   a linkage connecting the exterior turbine to the motor in such a way that the exterior turbine drives the motor only when the exterior turbine is caused to rotate at a rate greater than a rate of rotation of the motor.

7. The apparatus of claim 1, further comprising a shaft connecting the external turbine to the internal turbine, the shaft extending through the leading side of the exhaust pipe extension.

* * * * *